UNITED STATES PATENT OFFICE.

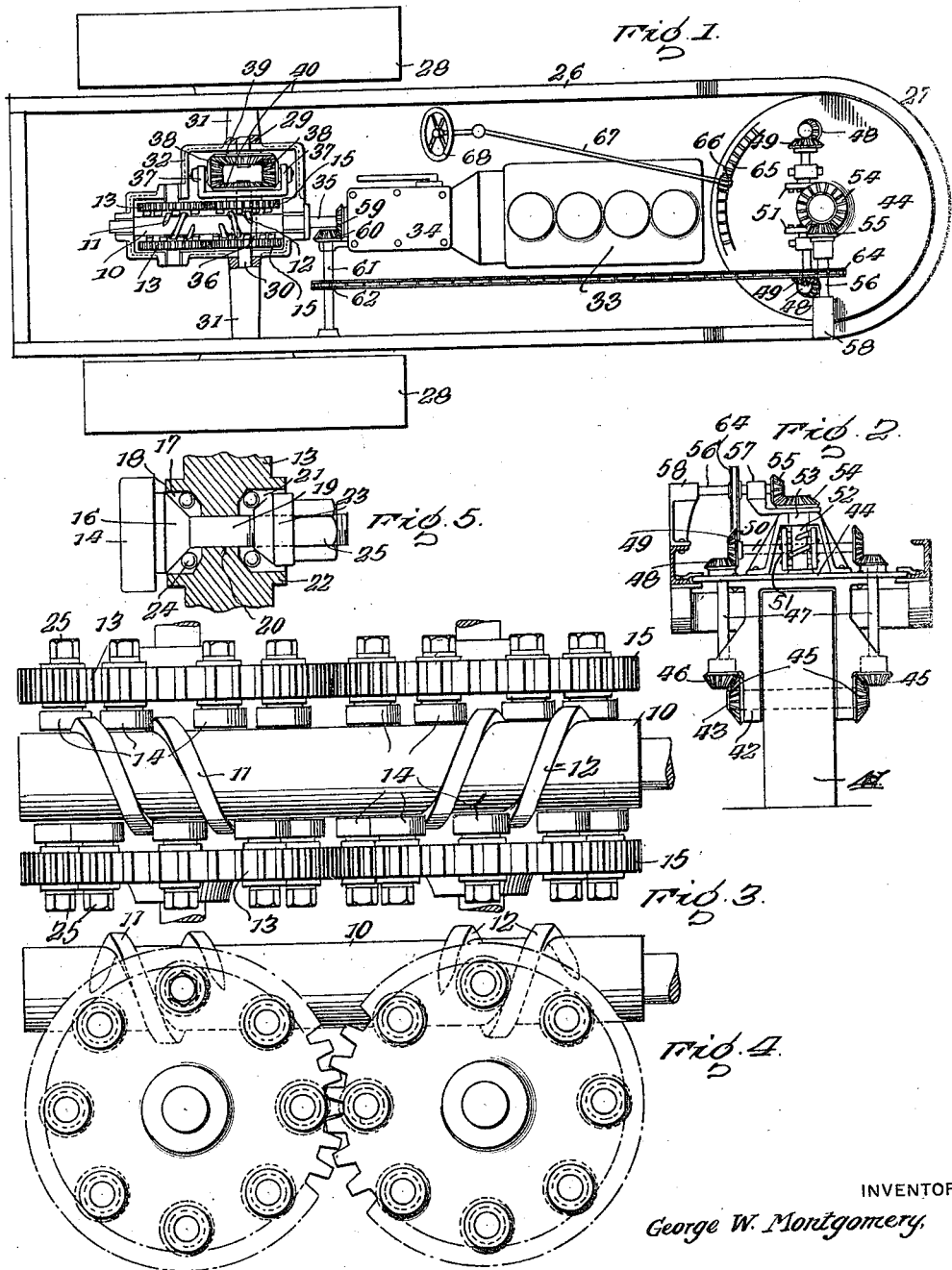

GEORGE W. MONTGOMERY, OF BRANDYWINE, MARYLAND.

GEARING.

1,322,599.

Specification of Letters Patent.

Patented Nov. 25, 1919.

Application filed January 7, 1918. Serial No. 210,674.

*To all whom it may concern:*

Be it known that I, GEORGE W. MONTGOMERY, a citizen of the United States, residing at Brandywine, in the county of Prince Georges and State of Maryland, have invented certain new and useful Improvements in Gearings, of which the following is a specification.

This invention has relation to gearing, and has for an object to proivde a gearing of a novel type adapted to transmit rotary motion from a revoluble member rotating about one axis to another revoluble member rotatable about an axis at right angles to the axis of the first member.

Another object of the invention is to provide an improved driving mechanism for a traction engine embodying a type of gearing of my invention, as set forth above.

A still further object of the invention is to provide a traction engine adapted to be operated by means of an internal combustion engine or similar prime mover, a driving mechanism for the rear wheels embodying a gearing of my invention, and a driving mechanism for a forward steering wheel embodying the principles of my invention, and means whereby the wheel may be rotated to steer the machine and whereby said steering wheel may be driven in any position thereof relative to the traction engine.

In addition to the foregoing my invention comprehends improvements in the details of construction and arrangement of the parts to be hereinafter more fully described and particularly set forth in the appended claims.

In the accompanying drawings in which similar and corresponding parts are designated by the same characters of reference throughout the several views in which they appear:—

Figure 1, is a view in top plan with parts broken away of a traction engine embodying my improvements.

Fig. 2, is a view of the traction engine in side elevation illustrating the steering mechanism.

Fig. 3, is a view in top plan of the gearing *per se* of my invention.

Fig. 4, is a view of the gearing in side elevation, and

Fig. 5, is a detail view in section taken through the bearing of one of the roller members of my improved gearing.

With reference to the drawings, and particularly Figs. 3 to 5 inclusive, in which the gearing of my invention is set forth in detail, 10 indicates a worm having two sets of threads, one set at each end indicated at 11 and 12, each thread being of slightly more than one convolution, and the threads formed in opposite directions, that is, left hand, and right hand for a purpose which will be presently obvious. Mounted at opposite sides of the worm in proximity to the threads 11 is a pair of disks 13 and each disk carries upon its inner face a plurality of rollers indicated at 14. The rollers are arranged in uniformly spaced circumferential order and the disks are arranged relative to the worm 10 so as to cause the prolonged axes of the rollers 14 to intersect successively the longitudinal axis of the worm. A second pair of disks 15 is provided, one at each side of the worm in proximity to the threads 12 thereof. The pairs of disks are connected with each other so as to rotate oppositely and in unison. As shown, this is accomplished by providing the disks with peripheral teeth whereby they become gears, and the disks or gears 13 and 15 at one side of the worm are in mutual meshing engagement, the same being true of the disks or gears at the other side. The inner faces of the gears 15 are similarly provided with rollers 14 corresponding in number to the number of rollers upon the gears 13 and likewise arranged so that their axes successively intersect the longitudinal axis of the worm. The gears are furthermore arranged relative to the worm so as to cause their rollers 14 to successively enter the spaces between the convolutions of the threads as clearly shown in Figs. 3 and 4. With reference to Fig. 5 of the drawings it will be seen that each roller 14 is formed with a conical extension 16 in one side face to enter a recess 17 within a flange 18 formed upon the inner face of either the gear 13 or 15, and the conical extension is formed with a bolt 19 which passes through an opening 20 in said gear and projects beyond the opposite side thereof. The bolt extends through a recess 21 similar to the recess 17 within an annular flange 22 formed upon the outer face of the gear, and a conical bearing member 23 is applied to the bolt and entered into said recess as clearly shown. Spherical bearing members 24 are inserted in the recesses 17 and 21 and are held between the conical member 16 and the inner wall of the recess 17, and between the inner wall of the recess 21 and the conical member 23 thereby mounting the roller 14 for free rotation without friction. A nut 25 is applied to the bolt to tighten the conical members against the bearings.

From the foregoing it will be obvious that if the worm 10 is rotated, a turning movement will be applied to the gears 15 by reason of the engagement of the rollers 14 thereof within the threads 12 to rotate both of said gears in the same direction. It will be also obvious that inasmuch as the threads 11 are formed oppositely to the threads 12 the gears 13 will be likewise rotated, both in the same direction, but in a direction opposite to the direction of rotation of the gears 15. As the gears 13 and 15 are in mesh the power will be applied uniformly to both sets of gears and the power may be taken from either set of gears or from both.

As a specific adaptation of my invention, I have disclosed in Figs. 1 and 2 of the drawings, a traction engine including a frame, 26, formed of longitudinal members connected at their forward ends by means of a semi-circular portion 27 designed to inclose the steering wheel. At the opposite end of said main frame there is provided a pair of ground or traction wheels 28 formed with axles 29 and 30 which extend through axle housings 31 formed with a gear casing 32 disposed centrally thereof. A prime mover is indicated at 33 and the same may comprise an internal combustion engine, transmitting its power through a transmission mechanism of conventional type including a reverse gear located within the casing 34 to a propeller shaft 35 extending longitudinally of the frame and entering the gear casing 32. The propeller shaft 35 is connected directly to the worm 10 which is mounted between the gears 13 and 15 mounted within the gear casing 32, the gears 15 rotating about an axis coincident with the axis of the driven shafts 29 and 30 of the traction wheels. In the present instance, however, the gears 15 are connected by means of a sleeve shaft 36 through which the driven shaft 30 extends, and the sleeve is formed upon one end with a pair of oppositely extending arms 37 forming a part of a differential mechanism. The extremities of the arms 37 carry orbitally movable bevel gears 38 for meshing engagement with gears 39 and 40 mounted on the inner terminals of the shaft 29 and 30 respectively.

It will be obvious from the foregoing that the power of the propeller shaft 35 may be transmitted to the gears 15 which are caused to rotate in unison, and by thus causing rotation of the arms 37 power is transmitted equally to both shafts 29 and 30 by reason of the operation of the differential mechanism in the usual manner. The gears 13 of my improved transmission gearing are mounted to rotate idly in bearings in the gear casing 32, and serve only to equalize and thrust on the worm shaft and thereby increase the efficiency of the gearing as an entirety. By actuating the reversing gear of the transmission mechanism it will be obvious that a traction engine may be caused to travel in a rearward direction.

It is my object also to apply power to the steering wheel which in the present instance is indicated at 41 and located at the forward end of the machine within depending bearings 42 which journal a shaft or axle 43 upon which the steering wheel is supported. The bearings 42 depend from a circular plate 44 inclosed within the semi-circular portion 27 of the frame of the traction machine, and the axle 43 carries bevel gears 45 in meshing engagement with bevel gears 46 located upon the lower end of shafts 47, which are extended at their upper ends through the plate 44 and journaled therein. The upper end of each shaft 47 carries a beveled gear 48 for meshing engagement with a bevel gear 49 one of which is mounted upon each end of a horizontal driven shaft 50 mounted in bearings upon the upper surface of the circular plate 44. The driven shaft 50 carries adjacent its intermediate portion a pair of disks 51 which serve the purpose of either of the gears 13 or 15. It will be noted however, that inasmuch as only one pair of disks 51 is provided, the formation of peripheral teeth thereon is not necessary as in the case of the gears 13 and 15. Each disk 51, however, carries upon its inner face a plurality of rollers similar to the rollers 14, for engagement with a vertical worm 52 journaled at its lower end in a bearing at the exact center of the plate 44 and at its upper end in a bearing 53 finding a support upon the plate 44 and this worm shaft stands directly over the center of the axle 43. The upper end of the worm 52 carries a beveled gear 54 which is in meshing engagement with the beveled gear 55 mounted upon a horizontal shaft 56 journaled at its inner end in a bearing 57 encircling loosely the worm 52, and in a bearing 58 finding a rigid support upon the main frame of the traction engine. The propeller shaft 35 is provided with a bevel gear 59 which is in meshing engagement with a bevel gear 60 mounted upon a transversely extending shaft 61 journaled in bearings formed on the transmission case and main frame of the traction engine, said shaft 61 carrying a sprocket wheel 62 around which an endless chain 63 passes. Said chain also passes around a sprocket wheel 64 mounted upon the aforesaid shaft 56.

From the foregoing it will be obvious that the power of the propeller shaft 35 is also transmitted through the gears 59 and 60 to the shaft 61, and thence through sprockets 62 and 64, and chain 63 to the shaft 56. Rotation of the shaft 56 is then transmitted through the gears 55 and 54 to the worm 52 which therefore becomes the propeller for the driven wheel. From the worm power is transmitted to the disks 51, which in turn rotate the driven shaft 50, and the power of the latter is transmitted through the gears 49 and 48 to the shaft 47 and thence through the gears 45 and 46 to the ground or steering wheel 41. The upper face of the circular disk 44 is formed with an arcuate series of rack teeth 65 for engagement by means of a pinion 66 mounted upon the outer end of the steering rod 67 having its inner end located adjacent the driver's seat and provided with a steering wheel 68. The circular plate 44 may thus be rotated, directing the steering wheel 41 in any direction desired so as to cause the vehicle to travel to the right or the left, it being obvious that power will be transmitted continuously to the steering wheel regardless of its position relative to the frame of the vehicle.

It will thus be seen that I have provided a gearing which is applicable to transmit power to the supporting wheels of a traction engine, and I lay particular stress upon my improvement in view of the fact that it provides a balanced structure receiving power uniformly to all parts with the result that friction is reduced and the durability and wearing qualities of the gearing enhanced. Other uses and advantages will readily occur to those skilled in the art to which this invention appertains.

While I have illustrated and described my invention with some degree of particularity I realize that in practice various alterations thereover may be made, and I therefore desire to reserve the right and privilege of changing the form of the details of construction, or otherwise altering the arrangement of the correlative parts without departing from the spirit of the invention or the scope of the appended claims.

Having thus described my invention what I claim as new and desire to secure by Letters Patent is:—

1. In a gearing, a gear having a plurality of circumferentially arranged transverse openings through its body and recesses in each face around said openings, a plurality of rollers, each including a bolt passing through one of said openings and a conical bearing member at the junction of the roller and bolt for insertion in one recess, a second conical member applied to the other end of the bolt for insertion in the opposite recess, a nut threaded on the bolt to hold the second bearing member in place, and balls in the recesses between the walls thereof and the conical members.

2. In a gearing, the combination with a propeller shaft, and a worm driven thereby and having two threads of opposite pitch; of a pair of intermeshing gears alongside the worm, one gear having rollers engaged by one thread and the other gear having rollers engaged by the other thread, and a driven shaft connected with one of said gears.

3. In a gearing, the combination with a propeller shaft, and a worm driven thereby and having two threads of opposite pitch; of a pair of gears at opposite sides of the worm and having rollers engaged by one thread, a driven shaft on which said gears are fast, and a second pair of gears idly mounted at opposite sides of the worm and having rollers engaged by the other thread, the gears of this pair meshing with those of the first pair, for the purpose set forth.

4. In a gearing, the combination with a prime mover, a propeller shaft driven thereby, and a horizontal worm driven by the propeller shaft and having a plurality of threads at different points in its length pitched in opposite directions; of a set of intermeshing gears along each side of the worm, each gear having rollers on one face engaged by the threads in one of said sets, the gears being located opposite each other in pairs, and connections between one pair and the driven shaft.

In testimony whereof I affix my signature in presence of a witness.

GEORGE W. MONTGOMERY.

Witness:
 M. E. JONES.